US010592009B2

(12) United States Patent
Rizvi et al.

(10) Patent No.: US 10,592,009 B2
(45) Date of Patent: Mar. 17, 2020

(54) INPUT DEVICES, METHODS FOR CONTROLLING AN INPUT DEVICE, AND COMPUTER READABLE MEDIA (71) Applicant: RAZER (ASIA-PACIFIC) PTE. LTD., Singapore (SG)

(72) Inventors: Farrukh Raza Rizvi, Singapore (SG); Sreenath Unnikrishnan, Singapore (SG); Rafael Raymund Viernes, Singapore (SG); Pierre Zeloon Lye, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/303,965

(22) PCT Filed: May 27, 2016

(86) PCT No.: PCT/SG2016/050251
§ 371 (c)(1),
(2) Date: Nov. 21, 2018

(87) PCT Pub. No.: WO2017/204745
PCT Pub. Date: Nov. 30, 2017

(65) Prior Publication Data
US 2019/0339793 A1 Nov. 7, 2019

(51) Int. Cl.
*G06F 3/0354* (2013.01)
*G06F 3/01* (2006.01)
(Continued)

(52) U.S. Cl.
CPC .......... *G06F 3/03543* (2013.01); *G06F 3/016* (2013.01); *G06F 3/0202* (2013.01); *G06F 3/038* (2013.01)

(58) Field of Classification Search
CPC .... G06F 3/03543; G06F 3/016; G06F 3/0202; G06F 3/038
See application file for complete search history.

(56) References Cited

U.S. PATENT DOCUMENTS 5,879,088 A    3/1999  English
6,243,078 B1*  6/2001  Rosenberg .............. A63F 13/06
                                                     345/161
(Continued)

FOREIGN PATENT DOCUMENTS

KR    10-2011-0137420 A    12/2011
WO    WO 00/39783 A1        7/2000
(Continued)

OTHER PUBLICATIONS

International Search Report and Written Opinion, dated Feb. 17, 2017, for the corresponding International Application No. PCT/SG2016/050251 in 9 pages.

(Continued)

*Primary Examiner* — Tom V Sheng
(74) *Attorney, Agent, or Firm* — Polsinelli PC (57) ABSTRACT According to various embodiments, an input device may be provided. The input device may include: a housing with a lower portion and an upper portion; a depressible button provided in the upper portion; a first magnetic component coupled to the depressible button and configured to move at least substantially along an axis when the depressible button is depressed; a second magnetic component coupled to the lower portion at least substantially at the axis, wherein at least one of the first magnetic component and the second magnetic component includes an electromagnet; an interface configured to receive control information from a computing
(Continued)

device external to the input device; and a control circuit configured to control the electromagnet based on the control information.

19 Claims, 5 Drawing Sheets

(51) Int. Cl.
*G06F 3/02* (2006.01)
*G06F 3/038* (2013.01)

(56) References Cited

U.S. PATENT DOCUMENTS

| | | | |
|---|---|---|---|
| 7,106,313 B2 | 9/2006 | Schena et al. | |
| 7,939,774 B2 | 5/2011 | Corcoran et al. | |
| 8,279,176 B2 | 10/2012 | Krah et al. | |
| 8,441,444 B2* | 5/2013 | Moore | G06F 3/03543 |
| | | | 345/161 |
| 9,201,518 B2 | 12/2015 | Wang | |
| 2002/0067336 A1* | 6/2002 | Wegmuller | G06F 3/016 |
| | | | 345/156 |
| 2003/0107607 A1 | 6/2003 | Nguyen | |
| 2003/0222851 A1 | 12/2003 | Lai et al. | |
| 2006/0132446 A1 | 6/2006 | Soh et al. | |
| 2008/0018592 A1* | 1/2008 | Park | A63F 13/06 |
| | | | 345/156 |
| 2011/0069008 A1 | 3/2011 | Kao | |
| 2011/0303043 A1 | 12/2011 | Tang | |
| 2013/0154940 A1 | 6/2013 | Gan et al. | |
| 2013/0229380 A1 | 9/2013 | Lutz, III et al. | |
| 2014/0176441 A1 | 6/2014 | Casparian et al. | |
| 2015/0169087 A1 | 6/2015 | Kim | |
| 2015/0302966 A1* | 10/2015 | Soelberg | A63F 13/22 |
| | | | 463/37 |
| 2016/0195937 A1* | 7/2016 | Tachiiri | G05G 9/047 |
| | | | 345/157 |
| 2018/0194229 A1* | 7/2018 | Wachinger | G06F 3/016 |

FOREIGN PATENT DOCUMENTS

| | | |
|---|---|---|
| WO | WO 2007/025382 A1 | 3/2007 |
| WO | WO 2016/163944 A1 | 10/2016 |
| WO | WO 2016/163950 A1 | 10/2016 |

OTHER PUBLICATIONS

Wanjoo Park, et. al., "Haptic mouse interface actuated by an electromagnet", Proceedings of the International Conference on Complex, Intelligent and Software Intensive Systems, CISIS 2011, p. 643-646, 2011, Proceedings of the International Conference on Complex, Intelligent and Software Intensive Systems, CISIS 2011; ISBN-13: 9780769543734; DOI: 10.1109/CISIS.2011.107; Article No. 5989053; Conference: 5th International Conference on Complex, Intelligent and Software Intensive Systems, CISIS 2011, Jun. 30, 2011-Jul. 2, 2011; Publisher: IEEE Computer Society in 1 page (Abstract).

Extended European Search Report dated Apr. 2, 2019, 10 pages, for the corresponding European Patent Application No. 16903302.4.

* cited by examiner

INPUT DEVICES, METHODS FOR CONTROLLING AN INPUT DEVICE, AND COMPUTER READABLE MEDIA

TECHNICAL FIELD

Various embodiments generally relate to input devices, methods for controlling an input device, and computer readable media.

BACKGROUND

When buying most mice, including most of the gaming mice available on the market today, users have no option but to use the mouse with the click force that the mouse comes with. Different click forces, however, can be useful in different situations. For example, a MOBA (multiplayer online battle arena) or RTS (real-time strategy) player may keep the click force low for fast clicking during heated games, while a sniper in an FPS (first person shooter) game may keep the click force high in order to ensure that the mouse button is not pressed by mistake. Thus, there may be a need for adjustable click force mice.

SUMMARY OF THE INVENTION

According to various embodiments, an input device may be provided. The input device may include: a housing with a lower portion and an upper portion; a depressible button provided in the upper portion; a first magnetic component coupled to the depressible button and configured to move at least substantially along an axis when the depressible button is depressed; a second magnetic component coupled to the lower portion at least substantially at the axis, wherein at least one of the first magnetic component and the second magnetic component includes an electromagnet; an interface configured to receive control information from a computing device external to the input device; and a control circuit configured to control the electromagnet based on the control information.

According to various embodiments a method for controlling an input device may be provided. The input device may include a housing with a lower portion and an upper portion, a depressible button provided in the upper portion, a first magnetic component coupled to the depressible button and configured to move at least substantially along an axis when the depressible button is depressed, and a second magnetic component coupled to the lower portion at least substantially at the axis, wherein at least one of the first magnetic component and the second magnetic component includes an electromagnet. The method may include: receiving control information from a computing device external to the input device via an interface; and controlling the electromagnet based on the control information.

According to various embodiments, a computer readable medium may be provided. The computer readable medium may include program instructions which when executed by a processor cause the processor to perform a method for controlling an input device. The input device may include a housing with a lower portion and an upper portion, a depressible button provided in the upper portion, a first magnetic component coupled to the depressible button and configured to move at least substantially along an axis when the depressible button is depressed, and a second magnetic component coupled to the lower portion at least substantially at the axis, wherein at least one of the first magnetic component and the second magnetic component includes an electromagnet. The method may include: receiving control information from a computing device external to the input device via an interface; and controlling the electromagnet based on the control information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the input device as described in this description may include a memory which is for example used in the processing carried out in the input device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

When buying most mice, including most of the gaming mice available on the market today, users have no option but to use the mouse with the click force that the mouse comes with. Different click forces, however, can be useful in different situations. For example, a MOBA or RTS player may keep the click force low for fast clicking during heated games, while a sniper in an FPS game may keep the click force high in order to ensure that the mouse button is not pressed by mistake.

Some gamers may click their mouse buttons by mistake because of low click force which could have undesirable consequences in game. Furthermore, different games have different click requirements. For example, in MOBA (multiplayer online battle arena) or RTS (real-time strategy) games, being able to click with a high frequency is a desirable function in a mouse, while in FPS (first person shooter) games, users may prefer mice that enable them to click with the least possible latency. Once users buy a mouse, they cannot alter the tactile feel of the click in any way. Since different mice use different suppliers for their micro-switches, they may differ considerably in terms of tactile feel and click force. Since it is matter of personal preference, there is no "one size fits all" solution to this problem.

According to various embodiments, the problem of not being able to change the click force of a mouse for different uses may be addressed by providing a mouse with a switch which is configured to be customized, for example on the fly, for example using software.

According to various embodiments, an adjustable click force mouse (in other words: a mouse, in which a click force of at least one button is adjustable) may be provided.

According to various embodiments, click customization (for example click force and tactile feel customization), for example in a computer mouse, may be provided using magnetic repulsion.

According to various embodiments, an adjustable click force may be provided. According to various embodiments, an adjustable rebound force may be provided.

Figure 1A:
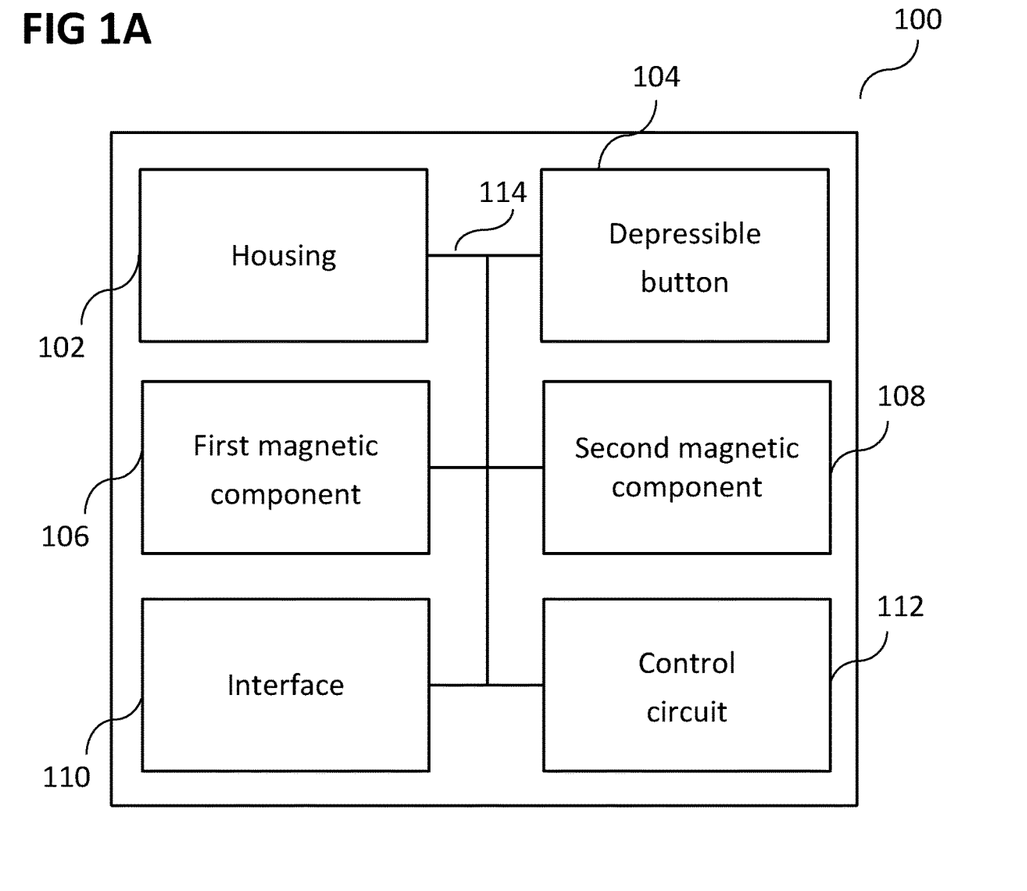
FIG. 1A shows an input device according to various embodiments.

FIG. 1A shows an input device 100 according to various embodiments. The input device 100 may include a housing 102. The housing 102 may include a lower portion and an upper portion (not shown in FIG. 1A). The input device 100 may further include a depressible button 104 provided in the upper portion. The input device 100 may further include a first magnetic component 106 coupled to the depressible button 104 and configured to move at least substantially along an axis when the depressible button 104 is depressed. The input device 100 may further include a second magnetic component 108 coupled to the lower portion at least substantially at the axis. At least one of the first magnetic component 106 and the second magnetic component 108 may include or may be an electromagnet. If the first magnetic component 106 is not an electromagnet, it may be a permanent magnet. If the second magnetic component 108 is not an electromagnet, it may be a permanent magnet. The input device 100 may further include an interface 110 configured to receive control information from a computing device external to the input device 100. The input device 100 may further include a control circuit 112 configured to control the electromagnet based on the control information. The housing 102, the depressible button 104, the first magnetic component 106, the second magnetic component 108, the interface 110, and the control circuit 112 may be coupled with each other, like indicated by lines 114, for example electrically coupled, for example using a line or a cable, and/or mechanically coupled.

In other words, an input device may include two magnetic components attached to a depressible button and another portion of the housing of the input device, and at least one of the two magnetic components may be an electromagnet which is controlled based on control information received from a computing device to which the input device is connected.

According to various embodiments, the control circuit 112 may be configured to control the electromagnet to adjust a click force of the depressible button 104.

According to various embodiments, the control circuit 112 may be configured to control the electromagnet to adjust a rebound force of the depressible button 104.

According to various embodiments, the control circuit 112 may be configured to control the electromagnet to provide a constant offset force to a click force of the depressible button 104.

According to various embodiments, the control circuit 112 may be configured to control the electromagnet based on an activation of the depressible button 104.

According to various embodiments, the control circuit 112 may be configured to active the electromagnet a predetermined time after activation of the depressible button 104.

According to various embodiments, the control circuit 112 may be configured to control the electromagnet to adjust a speed of returning of the depressible button 104 to state (or position) before activation of the depressible button 104.

According to various embodiments, the interface 110 may further be configured to communicate user input received at the input device 100 to the computing device.

According to various embodiments, the interface 110 may include or may be universal serial bus (USB) or Bluetooth or any other form of wireless communication.

According to various embodiments, the control information may be user-definable in the computing device.

Figure 1B:
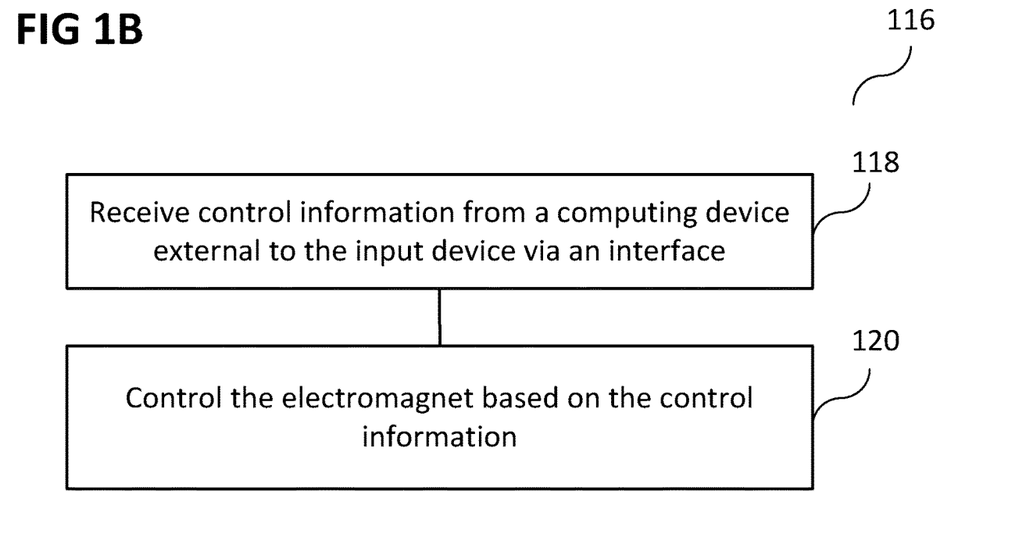
FIG. 1B shows a flow diagram illustrating a method for controlling an input device according to various embodiments.

FIG. 1B shows a flow diagram 116 illustrating a method for controlling an input device according to various embodiments. The input device may include a housing with a lower portion and an upper portion, a depressible button provided in the upper portion, a first magnetic component coupled to the depressible button and configured to move at least substantially along an axis when the depressible button is depressed, and a second magnetic component coupled to the lower portion at least substantially at the axis, wherein at least one of the first magnetic component and the second magnetic component may include an electromagnet. In 118, control information may be received from a computing device external to the input device via an interface. In 120, the electromagnet may be controlled based on the control information.

According to various embodiments, the method may further include controlling the electromagnet to adjust a click force of the depressible button.

According to various embodiments, the method may further include controlling the electromagnet to adjust a rebound force of the depressible button.

According to various embodiments, the method may further include controlling the electromagnet to provide a constant offset force to a click force of the depressible button.

According to various embodiments, the method may further include controlling the electromagnet based on an activation of the depressible button.

According to various embodiments, the method may further include activating the electromagnet a pre-determined time after activation of the depressible button.

According to various embodiments, the method may further include controlling the electromagnet to adjust a speed of returning of the depressible button to state before activation of the depressible button.

According to various embodiments, the method may further include communicating user input received at the input device to the computing device via the interface.

According to various embodiments, the interface may include at least one of universal serial bus or Bluetooth.

According to various embodiments, the control information may be user-definable in the computing device.

According to various embodiments, a (for example tangible, for example non-transitory tangible) computer readable medium may be provided. The computer readable medium may include program instructions which when executed by a processor cause the processor to perform a method for controlling an input device. The input device may include a housing with a lower portion and an upper portion, a depressible button provided in the upper portion, a first magnetic component coupled to the depressible button and configured to move at least substantially along an axis when the depressible button is depressed, and a second magnetic component coupled to the lower portion at least substantially at the axis, wherein at least one of the first magnetic component and the second magnetic component includes an electromagnet. The method may include: receiving control information from a computing device external to the input device via an interface; and controlling the electromagnet based on the control information.

According to various embodiments, the computer readable medium may further include instructions which when executed by a processor cause the processor to perform controlling the electromagnet to adjust a click force of the depressible button.

According to various embodiments, the computer readable medium may further include instructions which when executed by a processor cause the processor to perform controlling the electromagnet to adjust a rebound force of the depressible button.

According to various embodiments, the computer readable medium may further include instructions which when executed by a processor cause the processor to perform controlling the electromagnet to provide a constant offset force to a click force of the depressible button.

According to various embodiments, the computer readable medium may further include instructions which when executed by a processor cause the processor to perform controlling the electromagnet based on an activation of the depressible button.

According to various embodiments, the computer readable medium may further include instructions which when executed by a processor cause the processor to perform activating the electromagnet a pre-determined time after activation of the depressible button.

According to various embodiments, the computer readable medium may further include instructions which when executed by a processor cause the processor to perform controlling the electromagnet to adjust a speed of returning of the depressible button to state before activation of the depressible button.

According to various embodiments, the computer readable medium may further include instructions which when executed by a processor cause the processor to perform communicating user input received at the input device to the computing device via the interface.

According to various embodiments, the interface may include or may be at least one of universal serial bus or Bluetooth.

According to various embodiments, the control information may be user-definable in the computing device (for example using a graphical user interface (GUI) on the computing device).

According to various embodiments, magnetic repulsion may be used to achieve a desired click force. The usage of magnetic repulsion may provide for a unique tactile feel, as the repulsion force may increase with the decrease in the distance between the two magnets, i.e., the plunger and the mouse switch. This may lead to a quick rebound of the mouse button, leading to a faster reset of the button. The user may be able to select, for example through software, if he/she wants a higher click force or only the rebound force, and may be able to determine how much this force should be. For example, a user may be able to adjust separate slider scales indicating click force or rebound force on the software, and adjusts each slider scale separately to indicate how soft or hard he would like the click force or the rebound force to be.

Figure 2:
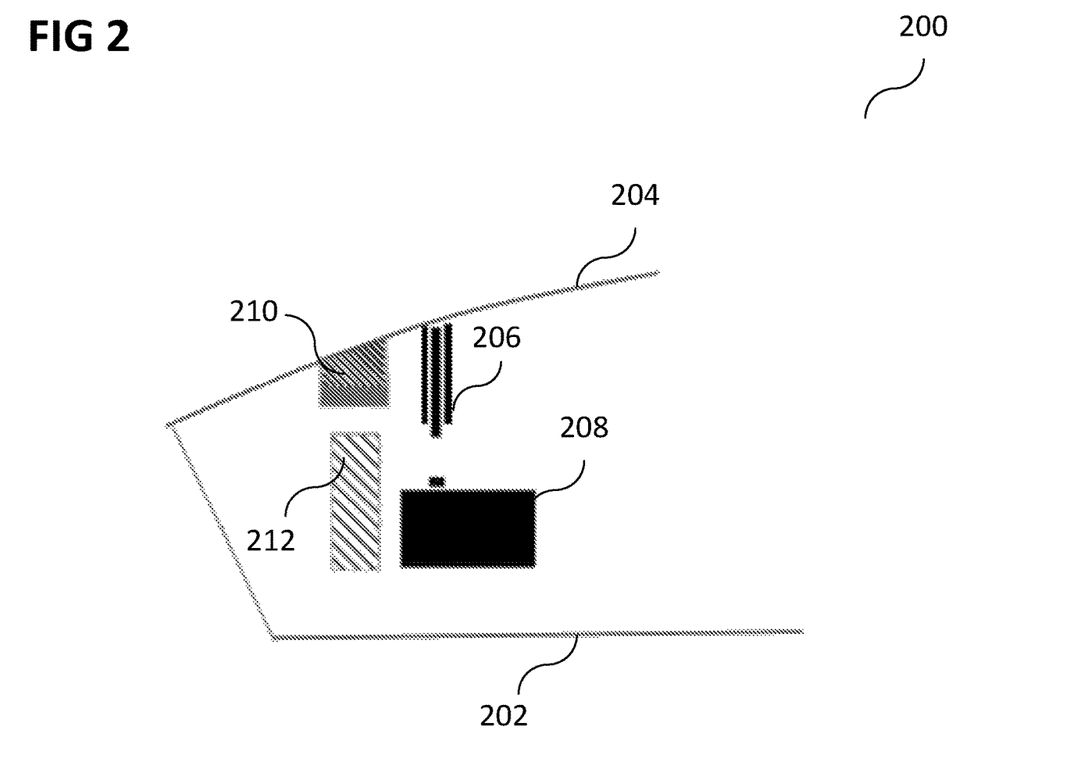
FIG. 2 shows an illustration of a mechanical structure of the mechanism according to various embodiments.

FIG. 2 shows an illustration 200 of a mechanical structure of the mechanism according to various embodiments. A bottom portion 202 and a top portion 204 (which may include a depressible keytop; in other words: which includes a depressible button) may form a housing of a computer mouse. A mouse button plunger 206 may be connected to the top portion 204. The mouse button plunger 206 may be configured to depress a switch 208 upon depression of the top portion 204 of the computer mouse. A first magnetic structure, for example a first magnet 210 (for example an axially magnetized disk magnet) may be mounted on the lower side of the mouse button (in other words: on the lower side of the top portion 204). A second magnetic structure, for example a second magnet 212 (for example an electromagnet with a current flowing through it adjustable by the user, for example by receiving instructions from a computer to which the mouse is connected, for example through Razer Synapse, for example through slider scales on Razer Synapse or on a game application) may be provided, and may be at least substantially aligned with the first magnet 210 in a direction of movement of the first magnet 210 during depression of the top portion 204.

Figure 3:
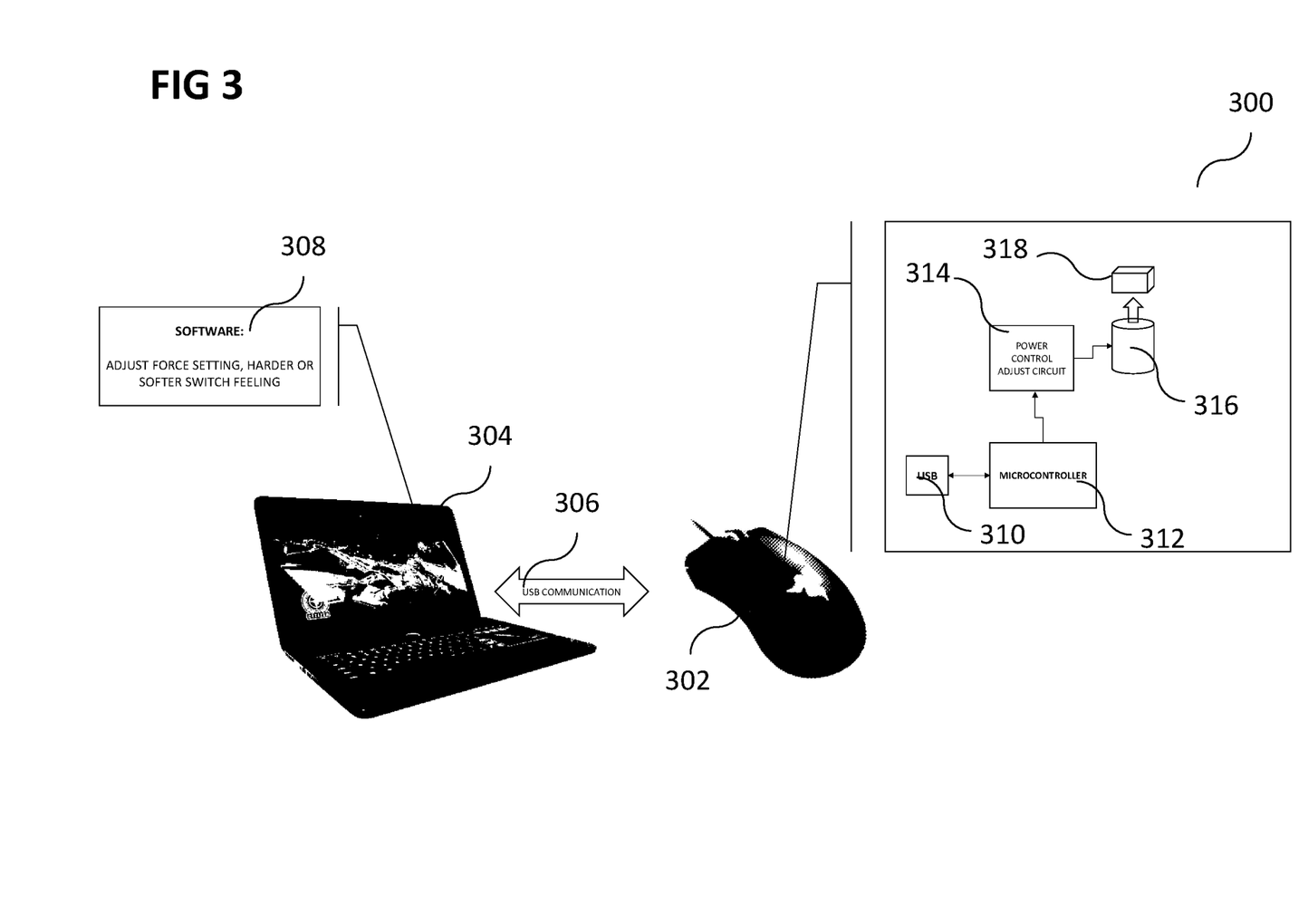
FIG. 3 shows an illustration of an implementation of the adjustable click force according to various embodiments.

FIG. 3 shows an illustration 300 of an implementation of the adjustable click force according to various embodiments. A computer mouse 302 may be provided in communication (for example via USB, universal serial bus), like indicated by arrow 306, with a computer 304. Software 308 may be provided in the computer 304 for adjusting a force setting of a button of the computer mouse 302 (for example for setting a harder or softer switch of the button of the computer mouse 302). For example, adjusting the click force for a harder switch of the button indicates that the user will experience more resistance when he depresses the switch of the mouse and a softer switch of the button indicates that the user will experience less resistance when he depresses the switch of the mouse. The computer mouse 302 may include a USB interface 310, for example for communication with the computer 304. The USB interface 310 may be connected to a microcontroller 312. The microcontroller 312 may control a power control circuit 314 based on instructions received from the computer 304 via the USB interface 310. The power control circuit 314 may control an electromagnet 316, which may, in conjunction with a permanent magnet 318 mounted on a bottom side of the button of the computer mouse 302, provide for an adjustable click.

Figure 4:
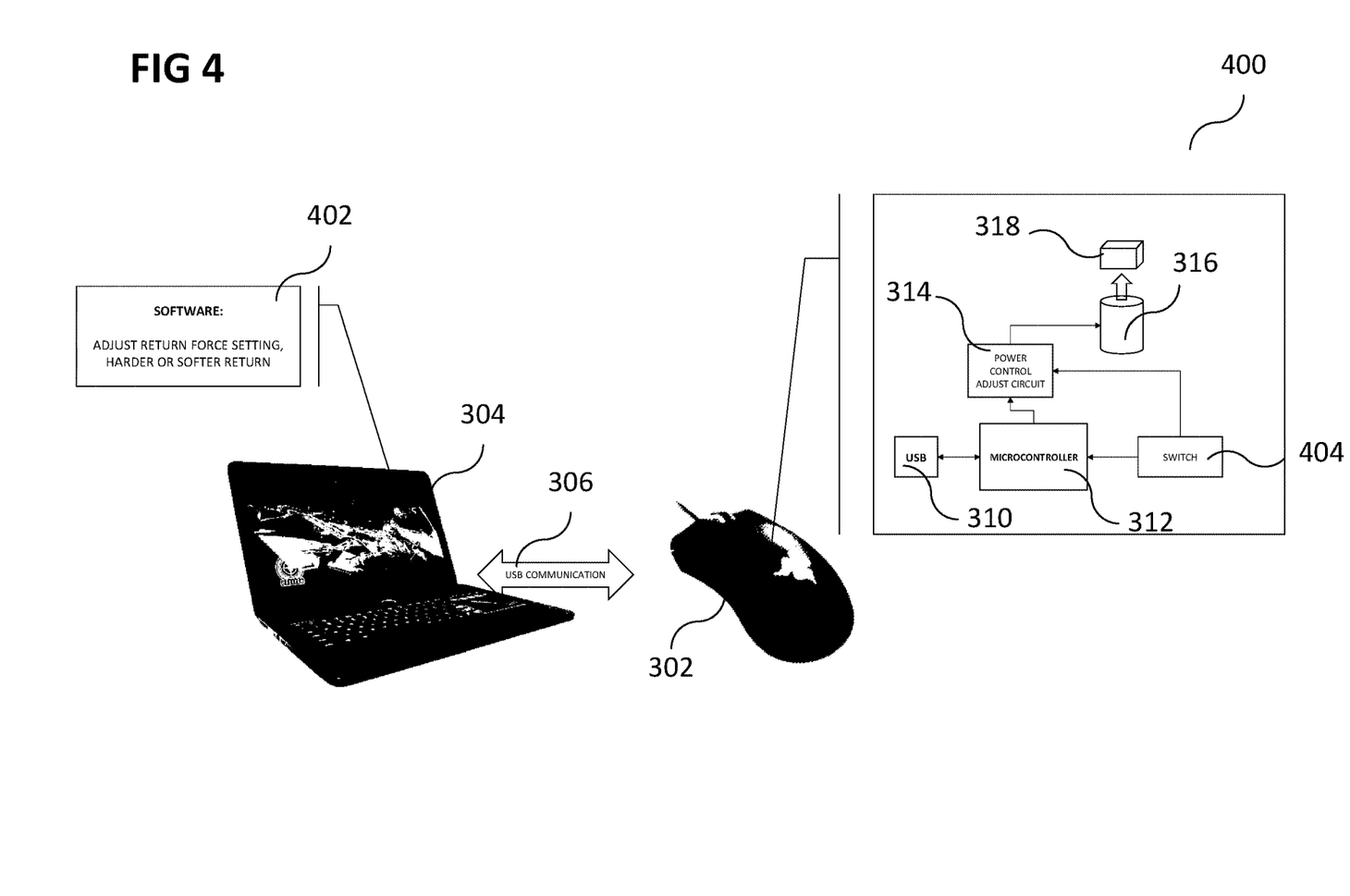
FIG. 4 shows an illustration of an implementation of an adjustable rebound force according to various embodiments.

FIG. 4 shows an illustration 400 of an implementation of an adjustable rebound force according to various embodiments. Various elements shown in FIG. 4 may be similar or identical to corresponding elements in FIG. 3, so that the same reference signs may be used and duplicate description may be omitted. Software 402 may be provided in the computer 304 to adjust a return force setting of the button of the computer mouse 302, for example for a harder or softer return of the button. A harder return of the button will indicate a faster return of the button to its original position while a soft return of the button indicates a slower return of the button to its original position. A switch 404 may be provided between the microcontroller 312 and the power control circuit 314 (in other words: power control adjust circuit), so as to provide switch gating, in other words, to switch on or off the electromagnet 316, depending on instructions received from the software 402, and depending on the button of the computer mouse 302 being depressed. For example, if a harder return of the button is selected in the software 402, the switch 404 may switch off the electromagnet 316 for only a short period after the button has been depressed (or may even not switch it off at all) to provide for a fast return of the button to the un-depressed state. For example, if a softer return of the button is selected in the software 402, the switch 404 may switch off the electromagnet 316 for a long period after the button has been depressed (or may change polarity of the electromagnet so as to not provide for a repelling, but for an attraction of the permanent magnet 318) to provide for a slow return of the button to the un-depressed state.

Figure 5:
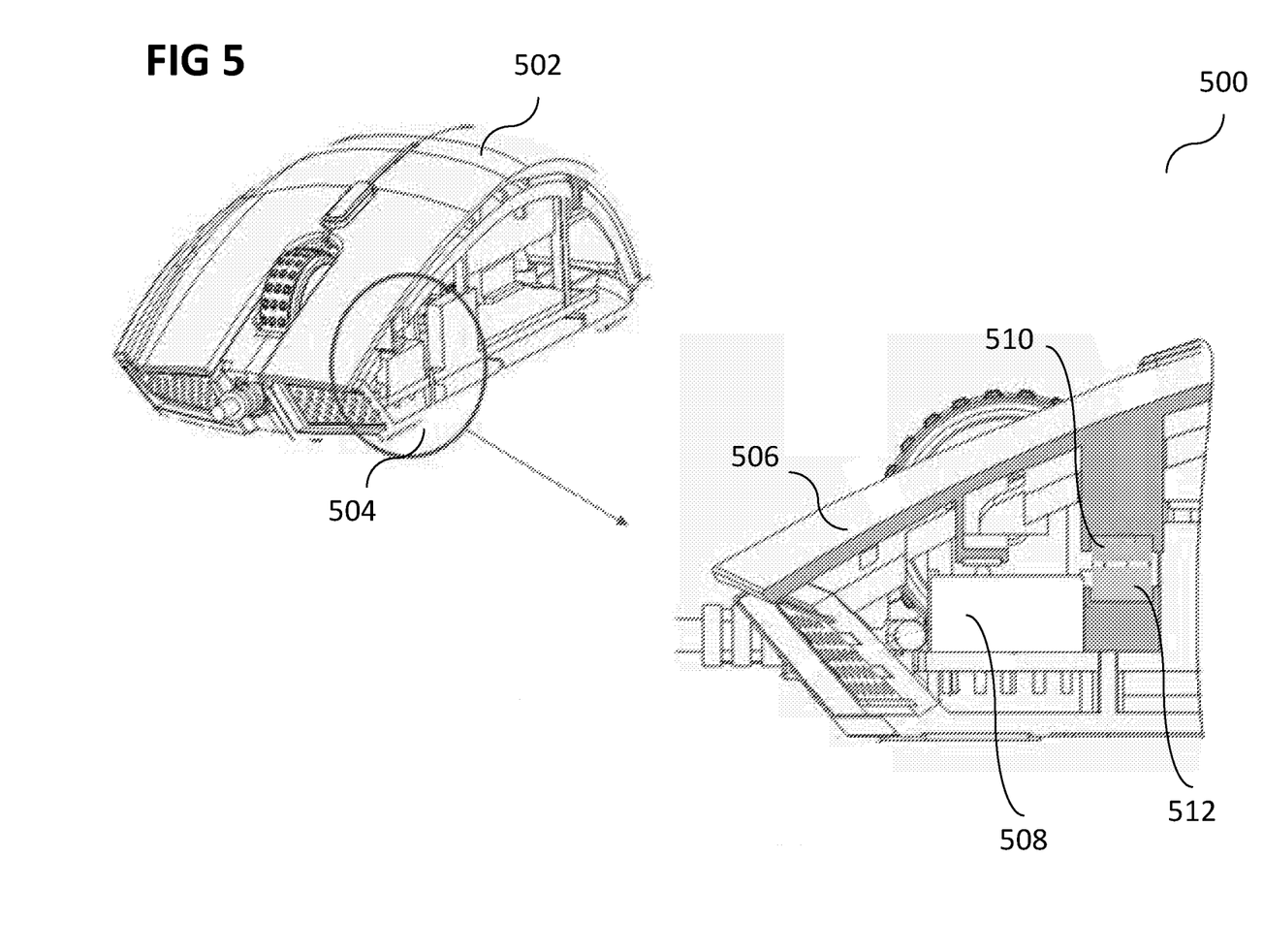
FIG. 5 shows an illustration of an internal mechanical structure of a magnetic repulsion mechanism according to various embodiments.

FIG. 5 shows an illustration 500 of an internal mechanical structure of a magnetic repulsion mechanism according to various embodiments. A computer mouse 502 may include a button arrangement 504, which is shown in an enlarged side view in FIG. 5. A button 506 (in other words: mouse button) may depress a switch 508 (in other words: a button switch) when depressed. Furthermore, two magnets (a first magnet 510 and a second magnet 512, one of which (or both of which) may be an electromagnet, which may be controlled according to instructions received by the computer mouse 502 from a computer to which the computer mouse 502 is connected).

It will be understood that various embodiments are described related to a mouse (in other words: computer mouse), but the adjustable click force or rebound force according to various embodiments may be provided in any kind of input device, for example a mouse, a keyboard, a gamepad, a joypad, or a joystick.

Various embodiments may provide the user with the ability to have a fast click rebound, enabling faster reset of the mouse switch and giving the user to ability to achieve a higher click frequency without altering the actuation force. This may be achieved by ensuring that the magnet remains turned off (i.e., does not offer any repulsive force or resistance to the click) until the user actuates the switch. When this happens, the magnetic repulsion may be turned on and may push back the mouse button, resulting in a faster reset.

Various embodiments may enable the user to adjust the tactile feel or the switch rebound characteristics of the switch.

According to various embodiments, an adjustable click force mechanism may be provided.

Various embodiments may enable users to customize the click force to prevent accidental clicking. Accidental clicking can be prevented by adjusting a harder click force so that the user will not depress the switch mouse button easily. Various embodiments may enable users to change (or tweak) the click force and tactile feel to their preferences to get high click frequency or low latency, ensuring their settings can match the game they are playing. Various embodiments may enable users to change the tactile feel of the click to suit their preferences. Various embodiments may provide users with the option to have a higher actuation force combined with a higher rebound force, or just to have the higher rebound force alone.

Various embodiments may provide a click force and a rebound force which is adjustable, for example via software, for example via Razer Synapse. This may ensure that the user does not have to count the number of clicks during the setting of the click force, just to ensure that both mouse clicks have the same click force setting. If it is done through software, the user may be able to set the click force or rebound force with much more ease. Adjustability through software may let the user change his settings without the use of a (hardware) tool, which could get lost easily. Being able to adjust the click force and the rebound force through software may allow the user to have preset click force and rebound force settings which may be bound to different games or programs, negating the need to change the force each time they launch a program or game for which they want the adjustable click force or rebound force. For example, the click force and rebound force settings, once it has been preset or configured on a software program or game application, can be stored as a profile on the computer, on the mouse, and/or on the cloud. By storing the profile on the cloud, a user with his preferred settings and configuration will be to connect a public computer or any portable mobile device to the software program for retrieving and downloading his stored profile to the computer or portable device. The stored profile can also include, other than the click force and rebound force settings, configuration data relating to button configuration, scroll wheel and mouse displacement sensitivity, lighting and haptic feedback response. The availability of the stored profile and configuration data allows the user to quickly use his mouse with his preferred settings whenever and wherever.

The click force adjustment using magnetic repulsion may not be a mechanical system. This may make sure that wear and tear with constant use is less of a factor and may lead to a high durability of the mechanism.

According to various embodiments, the click force may be controlled by the current passing through the solenoid and not by a spring which has physical limitations, and as such, a high click force range may be provided.

According to various embodiments, magnets may be used, so that the rebound force of the mouse button may be higher closest to the switch, which may lead to a fast rebound.

According to various embodiments, users may pick if they want a high click force or just a higher rebound force, which may not be possible in adjustable click force obtained merely through mechanical means.

Various embodiments may be used for any input device that uses buttons and for which the tactile feel is of high importance (for example a mouse, a keyboard, or any other kind of controller or input device).

The following examples pertain to further embodiments.

Example 1 is an input device comprising: a housing comprising a lower portion and an upper portion; a depressible button provided in the upper portion; a first magnetic component coupled to the depressible button and configured to move at least substantially along an axis when the depressible button is depressed; a second magnetic component coupled to the lower portion at least substantially at the axis, wherein at least one of the first magnetic component and the second magnetic component comprises an electromagnet; an interface configured to receive control information from a computing device external to the input device; and a control circuit configured to control the electromagnet based on the control information.

In example 2, the subject-matter of example 1 can optionally include that the control circuit is configured to control the electromagnet to adjust a click force of the depressible button.

In example 3, the subject-matter of any one of examples 1 to 2 can optionally include that the control circuit is configured to control the electromagnet to adjust a rebound force of the depressible button.

In example 4, the subject-matter of any one of examples 1 to 3 can optionally include that the control circuit is configured to control the electromagnet to provide a constant offset force to a click force of the depressible button.

In example 5, the subject-matter of any one of examples 1 to 4 can optionally include that the control circuit is configured to control the electromagnet based on an activation of the depressible button.

In example 6, the subject-matter of example 5 can optionally include that the control circuit is configured to active the electromagnet a pre-determined time after activation of the depressible button.

In example 7, the subject-matter of any one of examples 5 to 6 can optionally include that the control circuit is configured to control the electromagnet to adjust a speed of returning of the depressible button to state before activation of the depressible button.

In example 8, the subject-matter of any one of examples 1 to 7 can optionally include that the interface is further configured to communicate user input received at the input device to the computing device.

In example 9, the subject-matter of any one of examples 1 to 8 can optionally include that the interface comprises at least one of universal serial bus or Bluetooth.

In example 10, the subject-matter of any one of examples 1 to 9 can optionally include that the control information is user-definable in the computing device.

Example 11 is a method for controlling an input device, the input device comprising a housing comprising a lower portion and an upper portion, a depressible button provided in the upper portion, a first magnetic component coupled to the depressible button and configured to move at least substantially along an axis when the depressible button is depressed, and a second magnetic component coupled to the lower portion at least substantially at the axis, wherein at least one of the first magnetic component and the second magnetic component comprises an electromagnet; the method comprising: receiving control information from a computing device external to the input device via an interface; and controlling the electromagnet based on the control information.

In example 12, the subject-matter of example 11 can optionally include controlling the electromagnet to adjust a click force of the depressible button.

In example 13, the subject-matter of any one of examples 11 to 12 can optionally include controlling the electromagnet to adjust a rebound force of the depressible button.

In example 14, the subject-matter of any one of examples 11 to 13 can optionally include controlling the electromagnet to provide a constant offset force to a click force of the depressible button.

In example 15, the subject-matter of any one of examples 11 to 14 can optionally include controlling the electromagnet based on an activation of the depressible button.

In example 16, the subject-matter of example 15 can optionally include activating the electromagnet a pre-determined time after activation of the depressible button.

In example 17, the subject-matter of any one of examples 15 to 16 can optionally include controlling the electromagnet to adjust a speed of returning of the depressible button to state before activation of the depressible button.

In example 18, the subject-matter of any one of examples 11 to 17 can optionally include communicating user input received at the input device to the computing device via the interface.

In example 19, the subject-matter of any one of examples 11 to 18 can optionally include that the interface comprises at least one of universal serial bus or Bluetooth.

In example 20, the subject-matter of any one of examples 11 to 19 can optionally include that the control information is user-definable in the computing device.

Example 21 is a computer readable medium comprising program instructions which when executed by a processor cause the processor to perform a method for controlling an input device, the input device comprising a housing comprising a lower portion and an upper portion, a depressible button provided in the upper portion, a first magnetic component coupled to the depressible button and configured to move at least substantially along an axis when the depressible button is depressed, and a second magnetic component coupled to the lower portion at least substantially at the axis, wherein at least one of the first magnetic component and the second magnetic component comprises an electromagnet; the method comprising: receiving control information from a computing device external to the input device via an interface; and controlling the electromagnet based on the control information.

In example 22, the subject-matter of example 21 can optionally include instructions which when executed by a processor cause the processor to perform controlling the electromagnet to adjust a click force of the depressible button.

In example 23, the subject-matter of any one of examples 21 to 22 can optionally include instructions which when executed by a processor cause the processor to perform controlling the electromagnet to adjust a rebound force of the depressible button.

In example 24, the subject-matter of any one of examples 21 to 23 can optionally include instructions which when executed by a processor cause the processor to perform controlling the electromagnet to provide a constant offset force to a click force of the depressible button.

In example 25, the subject-matter of any one of examples 21 to 24 can optionally include instructions which when executed by a processor cause the processor to perform controlling the electromagnet based on an activation of the depressible button.

In example 26, the subject-matter of example 25 can optionally include instructions which when executed by a processor cause the processor to perform activating the electromagnet a pre-determined time after activation of the depressible button.

In example 27, the subject-matter of any one of examples 25 to 26 can optionally include instructions which when executed by a processor cause the processor to perform controlling the electromagnet to adjust a speed of returning of the depressible button to state before activation of the depressible button.

In example 28, the subject-matter of any one of examples 21 to 27 can optionally include instructions which when executed by a processor cause the processor to perform communicating user input received at the input device to the computing device via the interface.

In example 29, the subject-matter of any one of examples 21 to 28 can optionally include that the interface comprises at least one of universal serial bus or Bluetooth.

In example 30, the subject-matter of any one of examples 21 to 29 can optionally include that the control information is user-definable in the computing device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An input device comprising:
   a housing comprising a lower portion and an upper portion;
   a depressible button provided in the upper portion;
   a first magnetic component mounted on the depressible button and configured to move at least substantially along an axis when the depressible button is depressed;
   a second magnetic component coupled to the lower portion at least substantially at the axis, wherein at least one of the first magnetic component and the second magnetic component comprises an electromagnet;
   an interface configured to receive control information from a computing device external to the input device; and
   a control circuit configured to control the electromagnet based on the control information;
   wherein the control information activates or deactivates at least one electromagnet for a pre-determined time after activation of the depressible button.

2. The input device of claim 1,
   wherein the control circuit is configured to control the electromagnet to adjust a click force and/or a rebound force of the depressible button and is connected to a switch for activating and deactivating the electromagnet.

3. The input device of claim 1,
   wherein the control circuit is configured to at least one of control the electromagnet to provide a constant offset force to a click force of the depressible button or control the electromagnet based on an activation of the depressible button.

4. The input device of claim 1,
   wherein the control circuit is configured to control the electromagnet to adjust a speed of returning of the depressible button to an un-depressed state before activation of the depressible button.

5. The input device of claim 1,
   wherein the interface is further configured to communicate user input received at the input device to the computing device.

6. The input device of claim 1,
   wherein the interface comprises at least one of universal serial bus or Bluetooth.

7. The input device of claim 1,
   wherein the control information is user-definable in the computing device.

8. A method for controlling an input device, the input device comprising a housing comprising a lower portion and an upper portion, a depressible button provided in the upper portion, a first magnetic component mounted on the depressible button and configured to move at least substantially along an axis when the depressible button is depressed, and a second magnetic component coupled to the lower portion at least substantially at the axis, wherein at least one of the first magnetic component and the second magnetic component comprises an electromagnet; the method comprising:
   receiving control information from a computing device external to the input device via an interface; and
   controlling the electromagnet based on the control information;
   wherein the control information activates or deactivates at least one electromagnet for a pre-determined time after activation of the depressible button.

9. The method of claim 8, further comprising:
   controlling the electromagnet to adjust a click force and/or a rebound force of the depressible button.

10. The method of claim 8, further comprising:
    controlling the electromagnet to provide a constant offset force to a click force of the depressible button.

11. The method of claim 8, further comprising:
    controlling the electromagnet based on an activation of the depressible button.

12. The method of claim 11, further comprising:
    controlling the electromagnet to adjust a speed of returning of the depressible button to an un-depressed state before activation of the depressible button.

13. The method of claim 8, further comprising:
communicating user input received at the input device to the computing device via the interface.

14. The method of claim 8,
wherein the interface comprises at least one of universal serial bus or Bluetooth.

15. The method of claim 8,
wherein the control information is user-definable in the computing device.

16. A non-transitory computer readable medium comprising program instructions which when executed by a processor cause the processor to perform a method for controlling an input device, the input device comprising a housing comprising a lower portion and an upper portion, a depressible button provided in the upper portion, a first magnetic component mounted on the depressible button and configured to move at least substantially along an axis when the depressible button is depressed, and a second magnetic component coupled to the lower portion at least substantially at the axis, wherein at least one of the first magnetic component and the second magnetic component comprises an electromagnet; the method comprising:
  receiving control information from a computing device external to the input device via an interface; and
  controlling the electromagnet based on the control information;
  wherein the control information activates or deactivates at least one electromagnet for a pre-determined time after activation of the depressible button.

17. The non-transitory computer readable medium of claim 16, further comprising instructions which when executed by a processor cause the processor to perform at least one of:
  controlling the electromagnet to adjust a click force and/or a rebound force of the depressible button,
  controlling the electromagnet to provide a constant offset force to a click force of the depressible button, or
  communicating user input received at the input device to the computing device via the interface.

18. The non-transitory computer readable medium of claim 16, further comprising instructions which when executed by a processor cause the processor to perform:
  controlling the electromagnet based on an activation of the depressible button.

19. The non-transitory computer readable medium of claim 18, further comprising instructions which when executed by a processor cause the processor to perform controlling the electromagnet to adjust a speed of returning of the depressible button to state before activation of the depressible button.

* * * * *